US006985603B2

(12) United States Patent
Lyons et al.

(10) Patent No.: US 6,985,603 B2
(45) Date of Patent: Jan. 10, 2006

(54) METHOD AND APPARATUS FOR EXTENDING VIDEO CONTENT ANALYSIS TO MULTIPLE CHANNELS

(75) Inventors: Damian Lyons, Putnam Valley, NY (US); Eric Cohen-Solal, Ossining, NY (US); Tomas Brodsky, Croton on Hudson, NY (US); Srinivas Gutta, Buchanan, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 727 days.

(21) Appl. No.: 09/928,795

(22) Filed: Aug. 13, 2001

(65) Prior Publication Data

US 2003/0031343 A1 Feb. 13, 2003

(51) Int. Cl.
*G06K 9/00* (2006.01)

(52) U.S. Cl. ....................... 382/103; 382/107; 382/236

(58) Field of Classification Search ................ 382/103, 382/107, 236, 298, 106; 703/8; 348/169, 348/211.5, 159, 441, 154, 153, 143; 342/357.07, 342/357.15; 235/411; 386/98
See application file for complete search history.

(56) References Cited

U.S. PATENT DOCUMENTS

| | | | | |
|---|---|---|---|---|
| 4,673,974 | A * | 6/1987 | Ito et al. | 348/159 |
| 5,041,909 | A * | 8/1991 | Okano | 348/385.1 |
| 5,258,837 | A * | 11/1993 | Gormley | 348/441 |
| 5,469,517 | A * | 11/1995 | Ohta | 382/252 |
| 6,069,653 | A | 5/2000 | Hudson | 348/143 |
| 6,573,929 | B1 * | 6/2003 | Glier et al. | 348/149 |
| 6,647,361 | B1 * | 11/2003 | Laird et al. | 703/8 |

FOREIGN PATENT DOCUMENTS

| | | |
|---|---|---|
| EP | 690628 A1 | 3/1996 |
| WO | WO9603005 | 7/1995 |

* cited by examiner

*Primary Examiner*—Daniel Miriam
*Assistant Examiner*—Barry Choobin
(74) *Attorney, Agent, or Firm*—Larry Liberchuk

(57) ABSTRACT

A video content analysis system extends content analysis capability of one system to multiple channels by providing for the spatial multiplexing of the multiple channels and appropriately analyzing the spatially multiplexed video signal. The resulting system may be lower in cost that present systems and permit the system to work with ancillary equipment such as video recorders. The system also preserves the real-time information inherent in the multiple source signals.

10 Claims, 3 Drawing Sheets

METHOD AND APPARATUS FOR EXTENDING VIDEO CONTENT ANALYSIS TO MULTIPLE CHANNELS

BACKGROUND OF THE INVENTION

1. Field of the Invention

The invention relates to multiple channel video systems, such as security systems and more particularly to such systems that perform video content analysis.

2. Background

In many instances, it is useful for video to be analyzed automatically by a computer system rather than having a person watch the video. For example, in a security system, a human observer is not likely to be sufficiently observant to catch a sudden change in a scene which remains changeless for hours at a time. Also, it is useful to have multiple scenes interpreted by a single observer. For example, one security guard may observe the goings on in multiple scenes captured by different cameras.

In domestic applications, video content from multiple sources, such as multiple channels, may be received and analyzed to automatically recommend changing a channel. For example, the printed name of a favorite actor might be found on one channel while the user is watching another channel.

The general field of video content analysis is a broad one involving many different motives for analyzing video content. But, generally speaking, "simple" surveillance devices such as video motion detectors and VCRs are designed and built to work with multiple channels of input. This decreases the amount of equipment a user has to buy and offers greatly increased value for money. However, more sophisticated video processing, such as that available as PC software, or as high-end motion detector modules, is designed to work on a single channel at a single time. For example, in advanced security systems, content analysis devices are designed to work on one channel at a time, requiring the users to purchase multiple devices, one for each "analyzed" channel.

Referring to FIG. 1, in a typical advanced security system, for example, video data is received from a video source 100 which may be, for example, data from a camera. A piece of ancillary equipment 195, such as a video recorder, may be somewhere in the data loop. A content analysis process 110 receives the data (perhaps in parallel or in series as indicated) analyzes it and presents results 120 to some other process, for example, an alarm process.

One system can be used to analyze multiple channels by scanning in a round robin fashion, but real time information may be lost by doing that, such as calculated data that rely on motion data. A principal cause of this delay is that fact that each analogue video signal needs to be digitized before it can be processed digitally. Switching from one signal to the next may incur a delay of up to one frame time while the digitizer attempts to synchronize with the sync of the new source. Thus for four video signals, the frame rate is not just four times less than for one signal; it may be as much as eight times less. Also, if an intervening piece of ancillary equipment, such as a video recorder, is in the loop, the rotating of multiple channels through that loop could make the data unusable for purposes of that ancillary equipment.

There exists a need in the art for ways of providing content analysis without the need for the purchase of multiple systems for providing content analysis and with provision for correct real time information.

SUMMARY OF THE INVENTION

A video content analysis system extends content analysis capability of one system to multiple channels by providing for the spatial multiplexing of the multiple channels and appropriately analyzing the spatially multiplexed video signal. The resulting system may be lower in cost that present systems and permit the system to work with ancillary equipment such as video recorders. The system also preserves the real-time information inherent in the multiple source signals.

According to an embodiment, the invention provides a method of analyzing content in video data, comprising the steps of multiplexing the video data such that video of multiple scenes are distributed in a single video stream, at least part of each of the video data being apportioned to a respective part of a moving image defined by a resulting multiplexed moving image, analyzing content of the multiplexed video image such that data in others of the each of the video data is ignored to produce an analysis particular to one of the multiple scenes.

According to another embodiment, the invention provides a method of analyzing multiple video channels, comprising the steps of multiplexing multiple video data sets at the multiplexer to produce a spatially multiplexed moving image, analyzing at least a first portion of the spatially multiplexed moving image, the first portion corresponding to a first of the channels, the step of analyzing including ignoring data in the multiplexed moving image corresponding to channels other than the first of the channels.

According to an embodiment, the invention provides a device for analyzing video content on multiple channels, comprising an input adapted to receive spatially multiplexed video data, a controller programmed to select spatially distinct portions of the video data, each of the portions respective of a particular video data channel, the controller being further programmed to analyze content of the spatially distinct portions such that data from one does not interfere with the analysis of another.

The invention will be described in connection with certain preferred embodiments, with reference to the following illustrative figures so that it may be more fully understood. With reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE PREFERRED EMBODIMENTS

Figure 1:
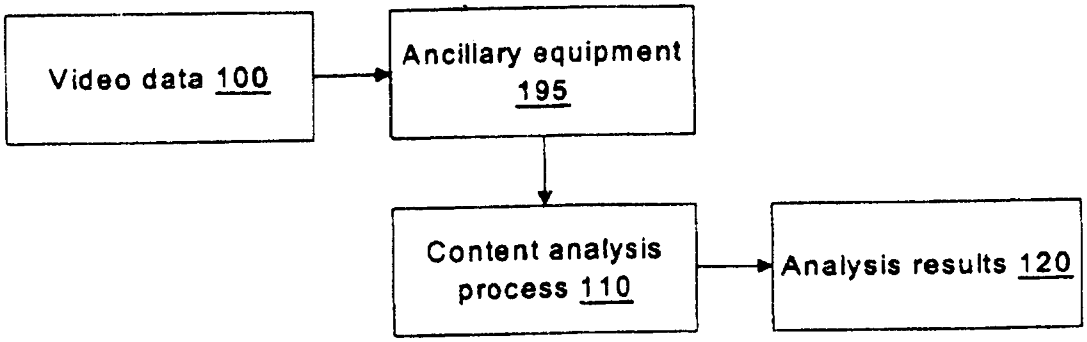
Fig. 1 (PRIOR ART)
FIG. 1 is an illustration of a video content analysis system according to the prior art.
Figure 2:
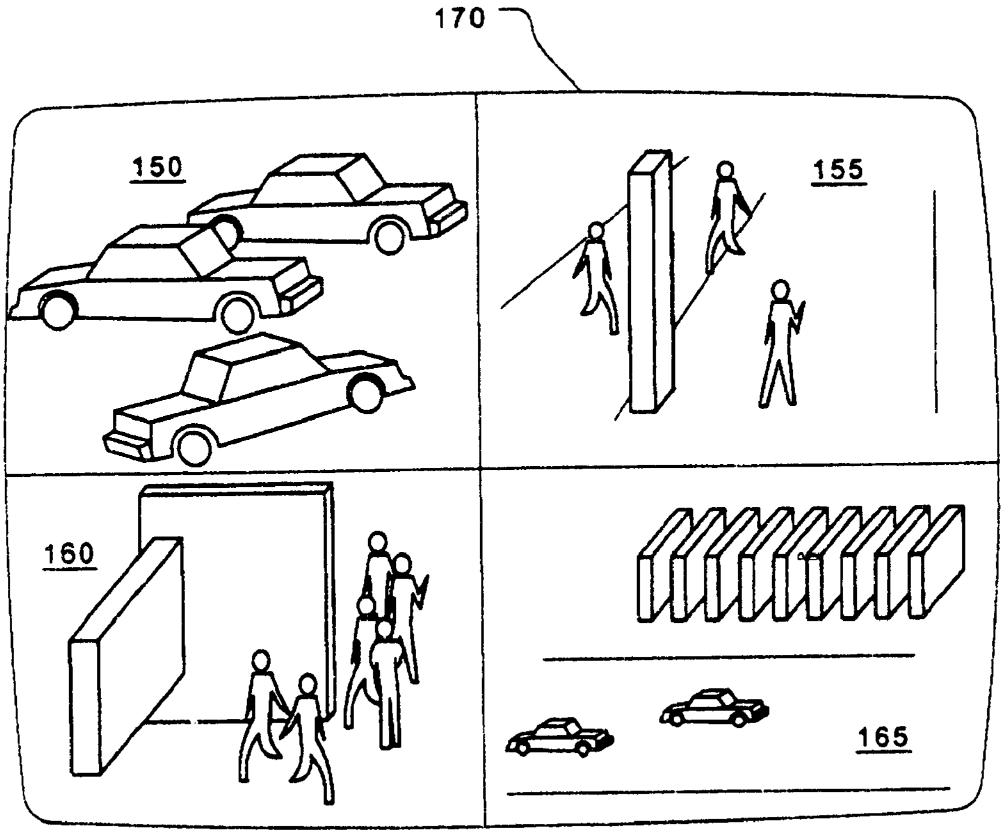
FIG. 2 is a visual representation of a spatially multiplexed video data stream for illustration purposes.

Referring to FIG. 2, the invention involves spatial multiplexing of a video signal. One simple type of spatial multiplexing is to shrink each image from multiple channels to a different part of a single image. Here, four channels of video are incorporated in respective frames 150, 155, 160, and 165. Although it possible to spatially multiplex the image in any arbitrary fashion, for example it may be viewed simply as arranging pixels from multiple subsampled scenes in different places in a single frame, it is preferred to do it in a way that makes the resulting image sensible to an observer. For example, when ancillary equipment is used to record or transfer the multiplexed video stream, the result may still be usable for its intended purpose. Such an arrangement will typically mean that adjacent pixels from each scene will be adjacent in the composite image. This arrangement is also typically easier to process on a computer, because the composite image will be loaded into memory and adjacent pixels will be in adjacent memory locations, and cache memory can be used effectively.

Figure 3:
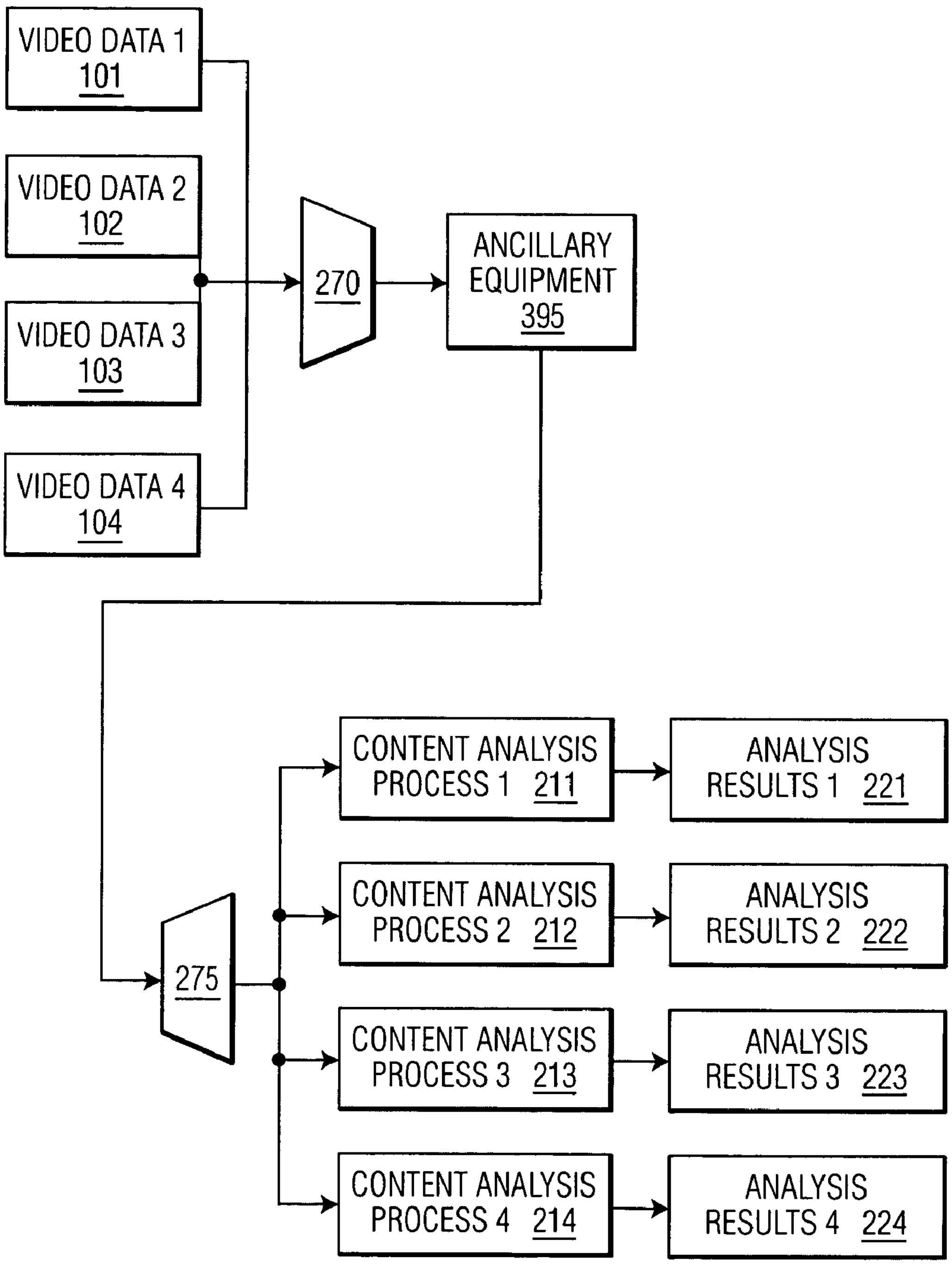
FIG. 3 is a diagram of data flow according to an embodiment of the invention.

Referring now to FIG. 3, a system for implementing the invention includes various video data sources 101, 102, 103, and 104. Although the number of sources shown is four, the number is quite arbitrary. The video data is applied to a spatial multiplexer 270. The latter combines the video data, preferably in a way that makes the video data intelligible when reproduced by conventional equipment. Thus, for example, showing the video as spatially separate images in each frame of the multiplexed image with each frame of the source corresponding to a frame of the multiplexed video is preferred. An example is shown in FIG. 2.

The multiplexed image may be applied to ancillary equipment 395 such as a video recorder, broadcast system, display, or other device that reproduces or transforms the video data conventionally. The ancillary equipment 395 is shown in series, but it could just as easily be connected in parallel or at some other point in the system. A demultiplexer 275 also receives the multiplexed video signal from the multiplexer 270. The demultiplexer may be a software front end to a software process that analyzes the multiple channels of video data. Alternatively, it may be a hardware device that outputs the separate video data on multiple physical channels. Basically, the demultiplexer 275 allocates the data in the multiplexed stream to respective content analysis processes 211, 212, 213, and 214 so that the video data can be analyzed without the interference of data from the other sources 101–104. Note that certain analysis process, such as motion detection, can be performed on the raw multiplexed image. Each independent process 211–214 may produce a respective result 221, 222, 223, and 224.

Note that the processes of FIG. 3 may be generated on a single piece of hardware such as a computer or embedded system. They may be achieved by multitasking or multithreading or any suitable software technique. Data may be shared among them depending on the type of analysis done. Also, another content analysis process (not shown) may be added which operates on the multiplexed video data permitting the separate content analysis processes (211–214) to avoid having to perform that process or that process might feed data to the separate content analysis processes 211–214. For example, such a process might perform motion detection on the multiplexed data.

Figure 4:
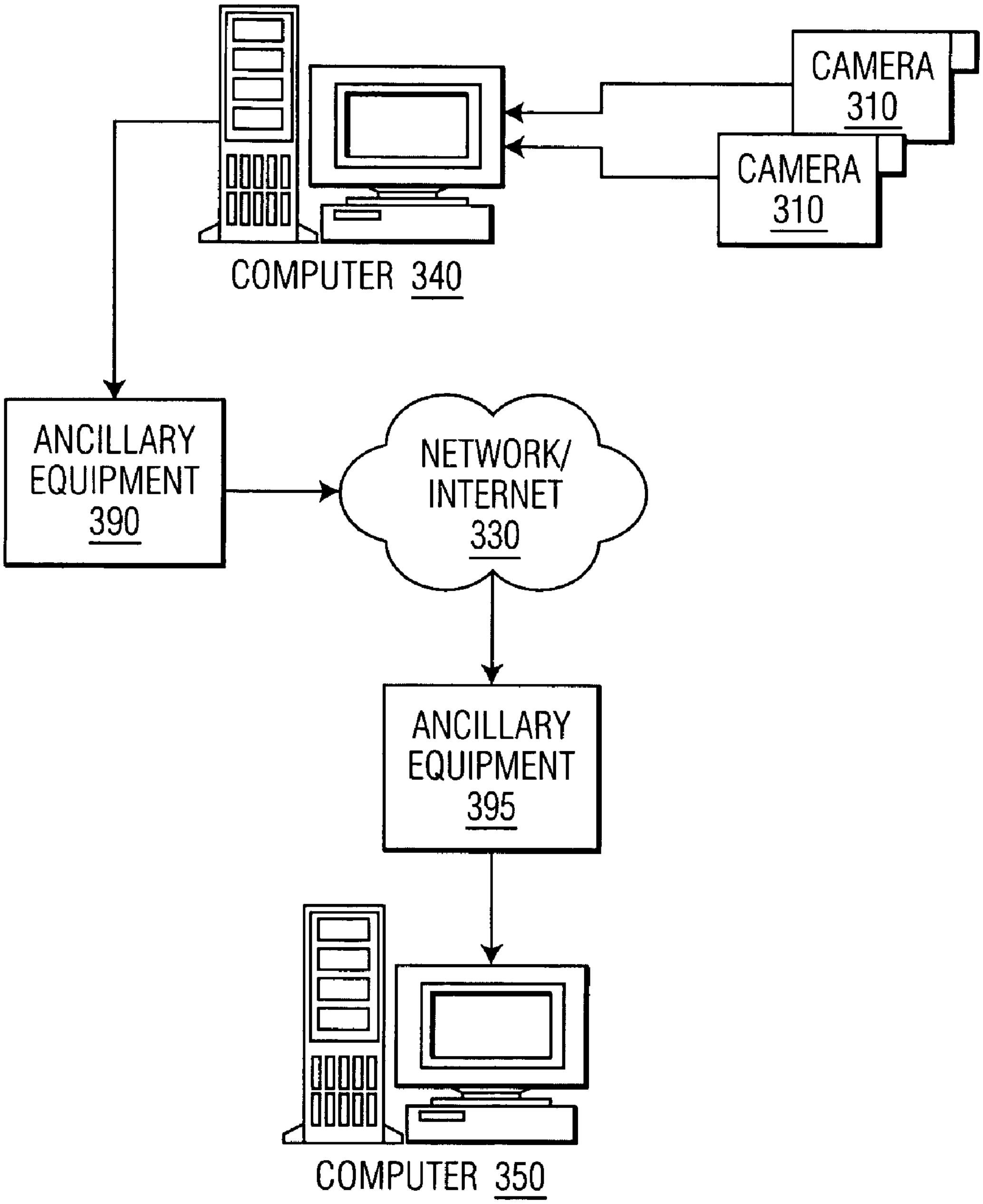
FIG. 4 is a diagram of an example hardware environment that could be used to implement the invention.

Referring now to FIG. 4, an example hardware environment that may be used to support the processes of the invention includes cameras 310 that receive video input from multiple respective scenes. A computer 340, which may be an embedded system or analog multiplexer receives the video data and multiplexes it. The multiplexed image may be applied in series or parallel to ancillary equipment 390 as discussed above. The multiplexed video data may be transmitted over a network, the Internet 330. Alternatively, the data may be transferred over an analog line or a switched network such as a telephone network. The data may be received by additional ancillary equipment 395 and demultiplexed by a suitable system, for example a computer 350. The latter may also perform content analysis.

It will be evident to those skilled in the art that the invention is not limited to the details of the foregoing illustrative embodiments, and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of analyzing content in video data, comprising the acts of:

spatially multiplexing said video data such that every frame of video of multiple scenes is spatially distributed in a single composite video stream, at least part of each of said video data being apportioned to a respective part of a moving image defined by a resulting multiplexed moving image; and performing computerized operations on the content of said multiplexed video image such that data in others of said each of said video data is ignored to produce an analysis particular to one of said multiple scenes.

2. A method as in claim 1, wherein said at least part of each of said video data is a subsampled moving image.

3. A method as in claim 1, further comprising recording said multiplexed moving image.

4. A method of analyzing multiple video channels, comprising the acts of:

non-selectively spatially multiplexing multiple video data sets at said multiplexer to produce a spatially multiplexed moving image; and performing computerized operations on at least a first portion of said spatially multiplexed moving image, said first portion corresponding to a first of said channels;

said step of performing computerized operations include ignoring data in said multiplexed moving image corresponding to channels other than said first of said channels.

5. A method as in claim 4, further comprising recording said multiplexed moving image on a video recorder.

6. A method as in claim 5, wherein said step of performing computerized operations includes spatially demultiplexing said multiplexed moving image such as to produce multiple moving images, each corresponding to a respective one of said channels.

7. A method as in claim 6, wherein said spatially multiplexed moving image contains multiple frames, each frame comprising a spatially separate parts of said multiplexed moving image, each part corresponding to a respective one of said channels.

8. A method as in claim 4, wherein said step of performing computerized operations includes spatially demultiplexing said multiplexed moving image such as to produce multiple moving images, each corresponding to a respective one of said channels.

9. A device for analyzing video content on multiple channels, comprising:

an input adapted to receive spatially multiplexed video data;

a controller programmed to select spatially distinct portions of said multiplexed video data received from said input, each of said spatially distinct portions respective of a particular video data channel; said controller being further programmed to perform computerized operations on said spatially distinct portions such that data from one spatially distinct portion does not interfere with the analysis of another spatially distinct portion.

10. A device as in claim 9, wherein said spatially multiplexed video data contains frames, each of which is divided into separate subframes, each of said subframes each corresponding to a different scene imaged by a respective camera.

* * * * *